(12) United States Patent
Ma et al.

(10) Patent No.: US 6,819,924 B1
(45) Date of Patent: Nov. 16, 2004

(54) UNIVERSAL QUALITY MEASUREMENT SYSTEM FOR MULTIMEDIA AND OTHER SIGNALS

(75) Inventors: Wei Ma, Castro Valley, CA (US); Martin Lee, Hayward, CA (US); Kambiz Homayounfar, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/744,521
(22) PCT Filed: May 25, 1999
(86) PCT No.: PCT/US99/11529
§ 371 (c)(1),
(2), (4) Date: Jan. 24, 2001
(87) PCT Pub. No.: WO00/72453
PCT Pub. Date: Nov. 30, 2000

(51) Int. Cl.[7] ................................. H04Q 7/34
(52) U.S. Cl. .................. 455/425; 455/67.14; 370/241; 370/249
(58) Field of Search .............................. 455/67.11, 423, 455/424, 425, 67.13, 67.14, 63.1; 370/241, 249

(56) References Cited

U.S. PATENT DOCUMENTS 5,987,320 A * 11/1999 Bobick ....................... 455/423
6,434,364 B1 * 8/2002 O'Riordain ............... 455/67.11

* cited by examiner

*Primary Examiner*—Edward F. Urban
*Assistant Examiner*—Blane J. Jackson
(74) *Attorney, Agent, or Firm*—Armstrong Teasdale LLP

(57) ABSTRACT

A method for measuring perceptual quality of voice signals, audio signals, audio-video signals, and multimedia signals in communication equipment in an operational embodiment communicates a processed test signal via a network from a first device to a second device. The processed test signal is then received by an equipment under test, which further processes the processed test signal to recover a representation of the test signal. The recovered test signal is then objectively analyzed to determine a measure of perceptual quality by comparing the recovered test signal to a pre-stored representation of the test signal.

A quality measurement unit that conveniently attaches to equipment under test identifies and evaluates quality of recovered test signals communicated from a remote device, or a test signal communicated by the equipment under test. In the latter case, the quality measurement unit communicates with both the equipment under test and with the network, so that the quality measurement unit itself receives a representation of the communicated test signal by the equipment under test.

24 Claims, 4 Drawing Sheets

UNIVERSAL QUALITY MEASUREMENT SYSTEM FOR MULTIMEDIA AND OTHER SIGNALS

BACKGROUND OF THE INVENTION

This invention relates to a system for measuring a signal quality, and more particularly to a system for measuring quality of multimedia signals communicated via a network.

Numerous processing and transmission methods have been devised for the communication of voice, audio, video, and multimedia information. These types of signals are collectively referred to herein as "voice, audio and video" (VAV) signals. VAV signals may be processed in many different ways before being transmitted to a receiver. For example, a VAV signal may be digitized, compressed, and modulated onto a carrier. The receiver then must transform the received signal back into a perceptible representation of the VAV signal.

Traditionally, received VAV signal quality is evaluated by subjective testing. However, this type of test is not practical as an in-service testing method, nor does this type of test produce consistent, reproducible results. Signal quality evaluation is further complicated when VAV communication is incorporated into very complex transport systems such as cellular code division multiple access (CDMA) systems or wideband CDMA systems. Different, but equally difficult challenges are presented when evaluating VAV quality in such non-deterministic environments as the Internet.

It is known to evaluate signal quality indirectly by measuring parameters such as signal-to-noise ratio (S/N), carrier-to-interference ratio (C/I), lost packet rate, and bit error rate (BER). However, it is difficult to relate these parameters to user perception of the quality of received VAV signals, particularly when such signals are highly compressed or processed. Also, these parameters are not well-suited to reflect VAV quality correctly and accurately over time.

Algorithms to estimate perceptual speech quality are known. For example, International Telecommunications Union standard P.861 is an objective algorithm that can be used to automatically compute a qualitative figure such as a Mean Opinion Score (MOS) for speech transmission. However, these types of tests require both an original and a test signal to be statically analyzed by an item of test equipment. Thus, if quality evaluation is to be done in the field with real signals, the test equipment must incorporate network architecture and protocols into its hardware, software, or firmware. Often, the network architecture is not available, or it may be difficult or expensive to implement. Proprietary restrictions may even preclude its implementation.

In view of the above, methods and apparatus for evaluating quality of received VAV signals that do not require explicit knowledge of the operation and configuration of a network, such as the transport technology used and the network access technology, would be desirable. It also would be desirable if the methods and apparatus provide real-time or non-real-time automated measurements of quality, so that interactive field testing, for example, could be performed. In addition, a common test platform for various types of VAV signals that easily connects to an equipment under test would be advantageous. Furthermore, methods and apparatus that provide reliable, repeatable, and easy-to-understand quantitative quality of service measurements for one-way, multi-hop, or round-trip measurements would be desirable.

BRIEF DESCRIPTION OF THE INVENTION

In one embodiment, the invention is a method for measuring perceptual quality of voice signals, audio signals, audio-video signals, and multimedia signals in communication equipment. A processed test signal is communicated via a network from a first device to a second device. The processed test signal is then received by an equipment under test, which further processes the processed test signal to recover a representation of the test signal. The recovered test signal is then objectively analyzed to determine a measure of perceptual quality by comparing the recovered test signal to a pre-stored representation of the test signal.

In another embodiment, the invention is a quality measurement unit that attaches to equipment under test to identify and evaluate quality of recovered test signals. The test signals are those communicated from a remote device and those communicated by the equipment under test. In the latter case, the quality measurement unit is configured to communicate with the equipment under test and the network, so that the quality measurement unit itself receives a representation of the communicated test signal by the equipment under test.

It will be seen that, in methods and apparatus of this invention, quality of received VAV signals are evaluated without an explicit knowledge of the network via which the equipment under test communicates. Moreover, both real-time and non-real-time quality analysis is possible, utilizing a common test platform for various types of VAV signals. The invention is applicable to a variety of different types of quantitative quality of service measurements, including one-way, multi-hop, and round-trip measurements.

DETAILED DESCRIPTION OF THE INVENTION

Figure 1:
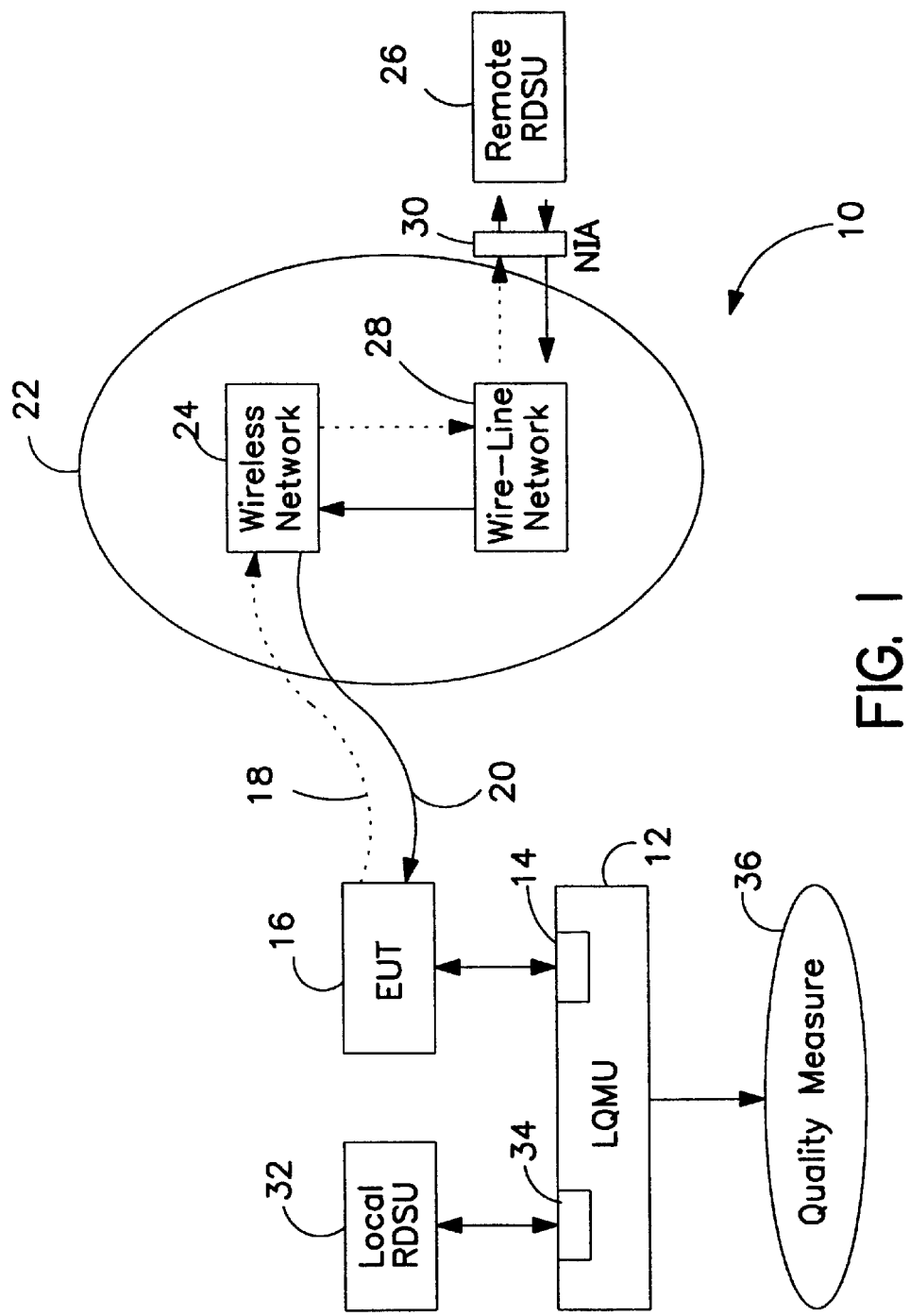
FIG. 1 is a block diagram of an embodiment of a quality measurement system for VAV signals suitable for one-way: quality measurements in accordance with the invention.

In one embodiment and referring to FIG. 1, a quality measurement system 10 for VAV signals is shown in conjunction with equipment under test 16 and a network 22. Quality measurement system 10 includes a local quality measurement unit (LQMU) 12. A port 14 of LQMU 12 is coupled to an equipment under test (EUT) device 16. In one exemplary embodiment, EUT 16 is a mobile or cellular telephone, and port 14 is electrically coupled to EUT 16 using, for example, a set of "hands-free" or "car kit" electrical terminals (not shown). The invention is not limited in applicability to mobile and cellular telephones, however.

EUT 16 transmits and receives, via communication paths 18 and 20, respectively, information to and from a network 22. For example, in the case of a cellular telephone, network 22 comprises a wireless network 24 and communication paths 18 and 20 are radio links. A remote reference data storage unit (RRDSU) 26 is also operatively coupled to network 22. In one exemplary embodiment, RRDSU 26 is a device for recording and playing reference signals that is coupled to wireless network 24 via a wire-line network 28, for example, a telephone answering machine. A network interface adapter (NIA) 30 is provided to condition signals output from RRDSU 26 into a form appropriate for transmission to network 28. Similarly, signals transmitted from network 28 to RRDSU 26 are converted by NIA 30 into a form suitable for processing by RRDSU 26.

In one embodiment, a local storage in the form of a local reference data storage unit (LRDSU) 32 is provided for LQMU 12 and is coupled to LQMU 12 via a second port 34. In another embodiment, local storage 32 may be internal to LQMU 12. In other embodiments, local storage, such as electronic or magnetic memory is internal to LQMU 12. LQMU 12 provides an indication of a quality measure 36 of a test signal received from RRDSU 26 via network 22 by EUT 16.

Knowledge of protocols, signaling, and configuration of network 22 required for the practice of the invention are isolated in EUT 16, a pre-existing piece of equipment, and in NIA 30. NIA 30, in many instances, may be a readily available device supplied by an operator of network 28 or an electronics distributor. The present invention allows different types of network 22 to be accommodated without requiring specific information concerning the nature of network 22 to be known or available to RRDSU 26, LQMU 12, or local storage 32. This allows RRDSU 26 to be coupled via NIA 30 to a publicly- or user-accessible service access point of network 22.

In one embodiment, port 14 and LQMU 12 are configured to collect received test signals from EUT 16 so that LQMU 12 is responsive to signals received by EUT 16. In one embodiment, port 14 and LQMU 12 are configured to control EUT 16 to transmit uplink signals via radio link 18. LQMU 12 is also configured to analyze the received test signals to perform an objective measurement of the quality of these signals. In one embodiment, embedded algorithms within LQMU 12 are configurable and selectable for one or more types of VAV signals.

RRDSU 26 is, for example, a storage unit including a recorder and a player (not shown separately in FIG. 1). The recorder is, for example, a readable/writeable mass storage device such as a hard disk drive, or any other device suitable for recording VAV signals. The player, in one embodiment, accesses the recorded VAV signals, which include reference VAV signals, and plays them back. RRDSU 26, in one embodiment, includes a controller module (not shown) that is controllable via signals received via network 22 to command RRDSU 26 to perform such tasks as start, stop, play, record, pause, seek, timestamp, etc. In one embodiment, RRDSU 26 comprises a digital answering machine to perform these functions. In one embodiment, RRDSU 26 is configured to transmit a test signal that is selected from voice, audio, video, and multimedia test signals.

Figure 2:
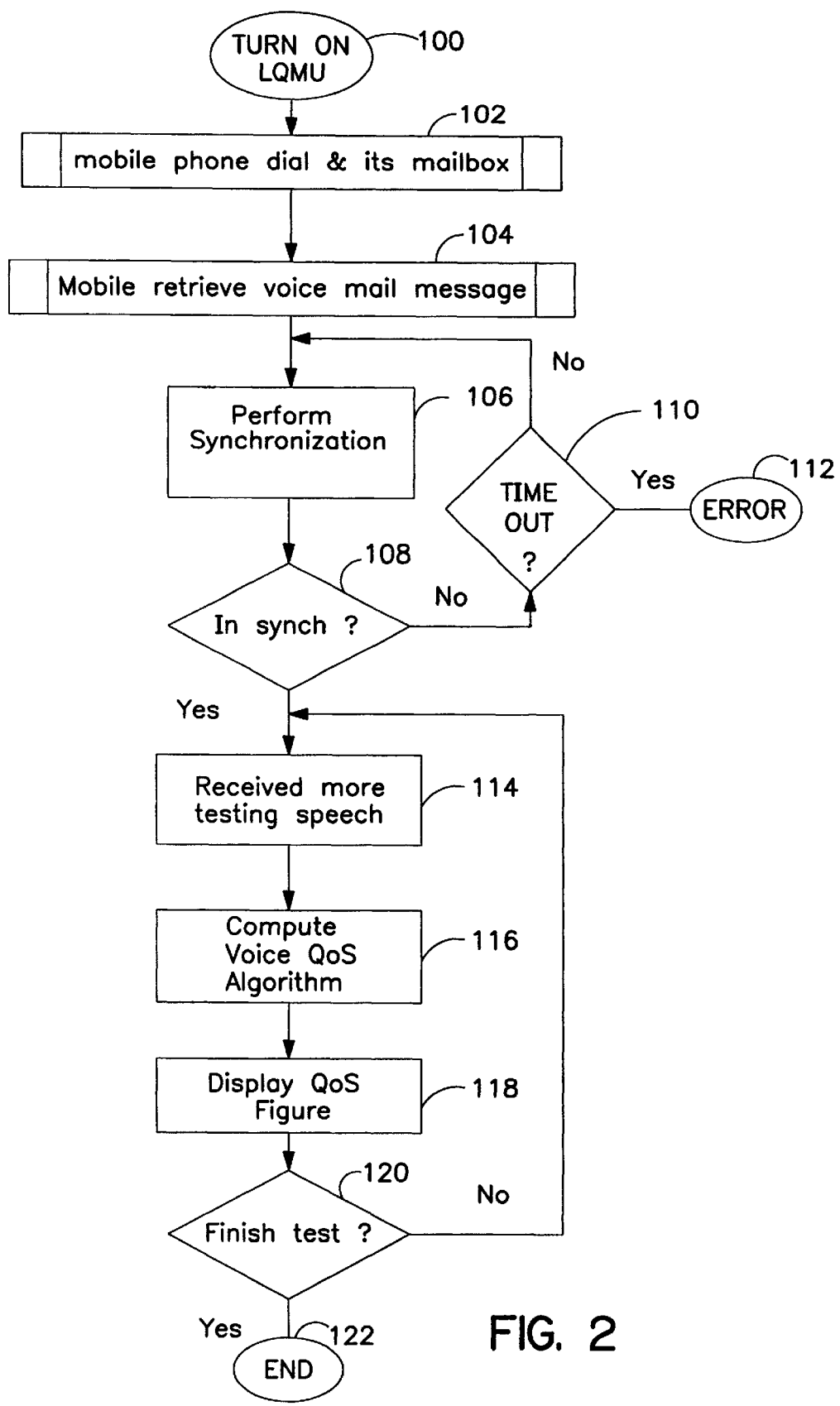
FIG. 2 is a flow chart of an embodiment of a quality measurement method applicable to the system of FIG. 1.

In one embodiment and referring to FIG. 2, quality measurement system 10 is utilized for testing EUT 16 in conjunction with network 22 comprising a wireless telephone network 24 to evaluate one-way downlink end-to-end VAV quality, i.e., the quality of a signal received via radio link 20 by EUT 16 from a base station (not shown) of network 24. Initially, LQMU 12 is turned on 100 and connected to EUT 16 so that it is responsive to receipt of a test message by EUT 16. EUT 16 places a call 102 to RRDSU 26 by dialing RRDSU telephone number so that RRDSU 26 transmits a test signal to EUT 16. In another embodiment, when EUT 16 is configured to communicate via a network other than a telephone network, an appropriate signaling technique is substituted for placing a telephone call to RRDSU 26. In other embodiments such signaling may also be performed manually, for example, by dialing a number on a keypad (not shown) of EUT 16. In one embodiment, RRDSU 26 is configured as a voice mailbox, so that dialing 102 RRDSU also includes dialing a voice mailbox of RRDSU 26 and retrieving 104 a test signal as a voice mail message. Prior to transmission of the test signal, for example, a voice message, the test signal is processed by NIA 30 so that it is in a form suitable for transmission over network 28. LQMU 12 then attempts to synchronize itself 106 with the test signal. Synchronization search 106 is continued until synchronization 108 is achieved. In one embodiment, when synchronization 108 is not achieved within a determined period of time 110, an error condition 112 is signaled. In one embodiment, by synchronizing 108 with the test signal, LQMU 12 analyzes signals received by EUT 16 to determine that a test signal has been received. It will be understood that EUT 16 performs further processing of signals received via network 24 to recover a representation of the test signal that is analyzed by EUT 16. This further processing, among other things, makes it possible for EUT 16 to be independent of the signal encodings and network protocols utilized by network 22.

After acquiring synchronization 108, the recovered test signal is received 114 by LQMU 12. The recovered test signal is compared to a pre-stored representation of a reference signal in LRDSU 32 and a quality of service (QoS) measure is determined 116 to provide an objective measure of received signal quality. This measure, or a representation of it, is displayed 118, for example, on a display screen (not shown). In another embodiment, the measure of quality is recorded for future display or analysis. In one embodiment, a predetermined number of tests are performed 120 during a call to RRDSU 26. The call from EUT 16 to RRDSU 26 can be terminated 122 either manually or automatically when the determined number of test or tests are complete.

In one embodiment, if LQMU 12 does not have sufficient processing power to evaluate quality of a received test signal as it is being received by EUT 16, the received test signal is stored in LRDSU 32 for later, off-line quality evaluation, for example, after the call from EUT 16 to RRDSU 26 is terminated.

Figure 3:
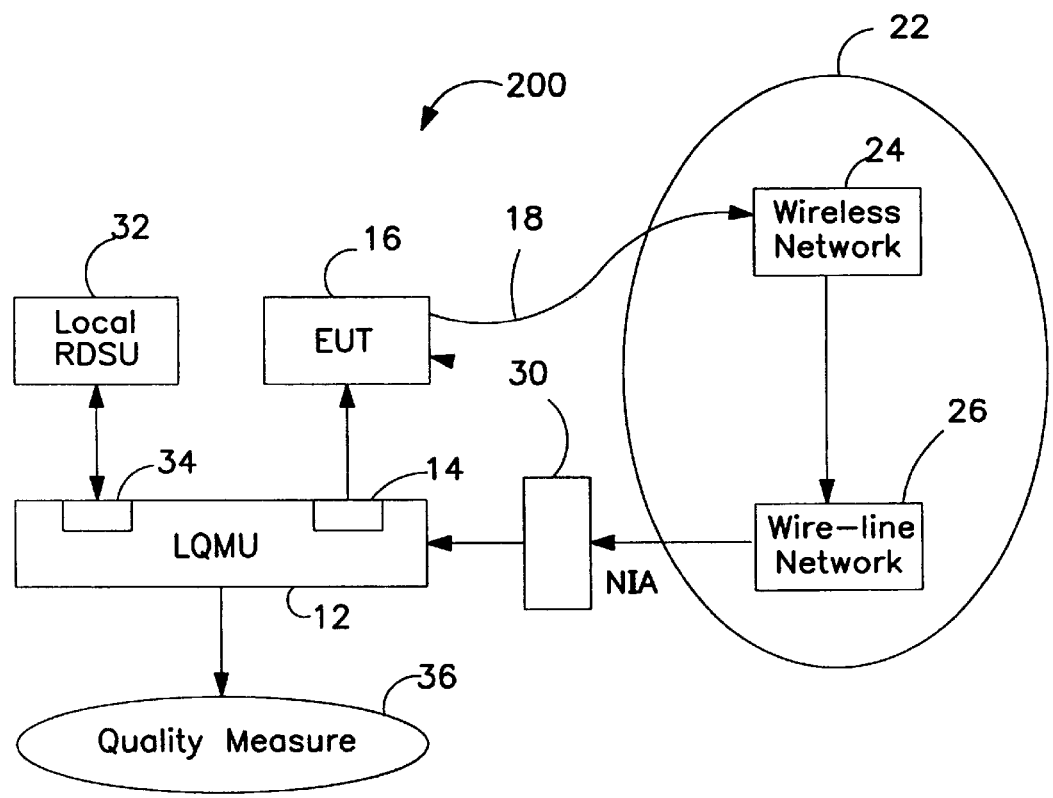
FIG. 3 is a block diagram of an embodiment of a quality measurement system suitable for round-trip quality measurements in accordance with the invention.

In yet another embodiment and referring to FIG. 3, an up-link testing system 200 does not require an RRDSU 26. Testing system 200 is shown in FIG. 3 in conjunction with network 22 and EUT 16. In this embodiment, EUT 16 is a cellular telephone transmitting via radio link 18 to a wireless network 24. LQMU 12 receives signals from NIA 30 via wire-line network 26. In one embodiment, NIA 30 is a modem, such as a computer modem, with which LQMU 12 is configured for communication. EUT 16 dials the telephone number of NIA 30 to initiate a test. LQMU 12 then injects a local-to-remote test signal into EUT 16, for example, via a hands-free kit, which is returned via network 22 and NIA 30 to LQMU 12. LQMU 12 then performs a quality of service evaluation on the received signal.

Figure 4:
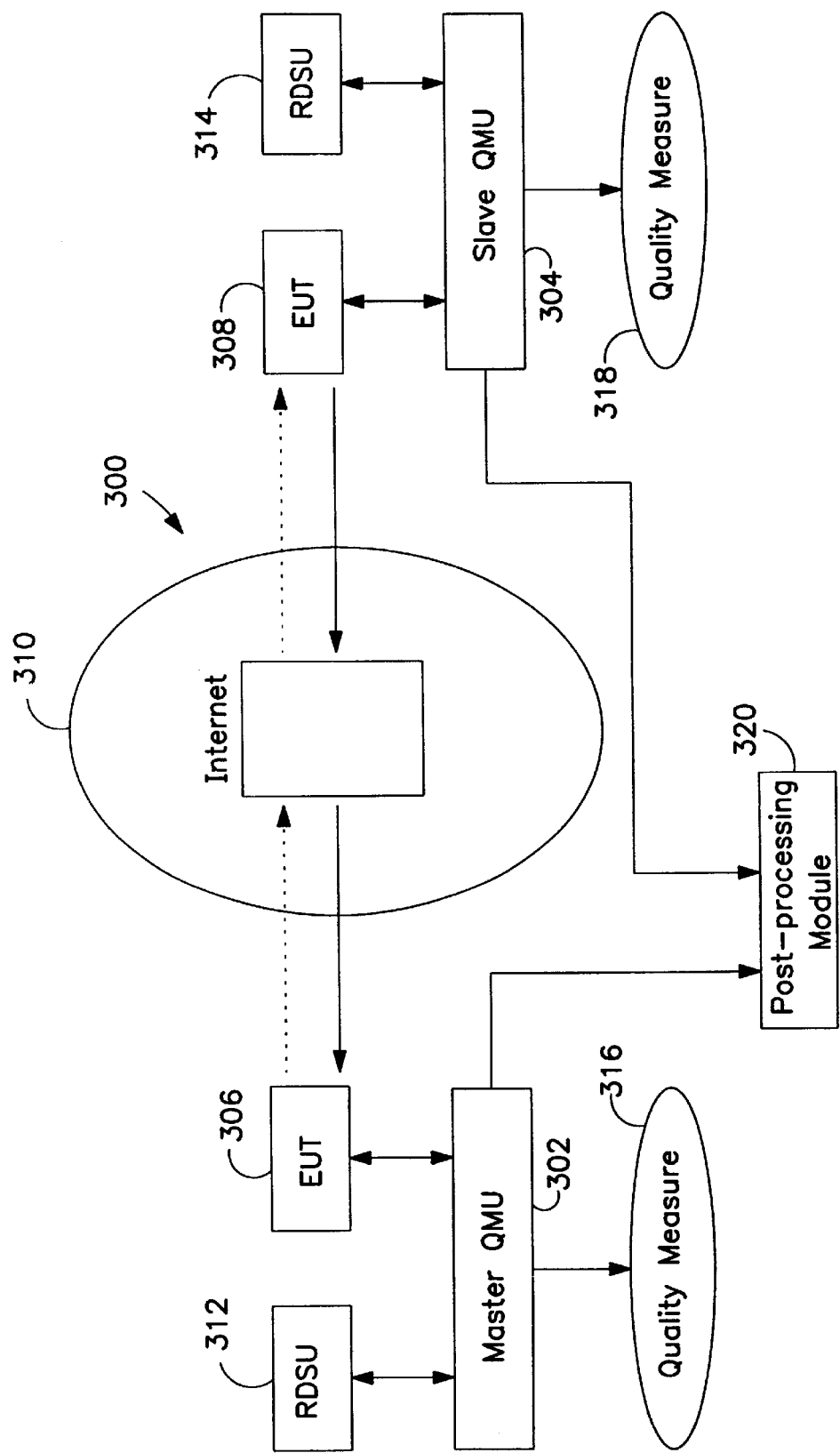
FIG. 4 is a block diagram of an embodiment of a quality measurement system suitable for two-way quality measurements in accordance with the invention.

In another embodiment and referring to FIG. 4, a two-way testing system 300 is provided having a master quality measurement unit (MQMU) 302 and a slave quality measurement unit (SQMU) 304. Two-way testing system 300 is shown in a configuration in which testing of EUTs 306 and 308 is performed in conjunction with a network 310. MQMU 302 is configured to initiate and coordinate communication between EUT 306 and EUT 308, for example, terminals providing VAV capabilities, via a network 310, for example, the Internet, and to provide timestamps for test results produced both by MQMU 302 and SQMU 304. Otherwise, MQMU 302 and SQMU 304 are configured similarly to LQMU 12 in that MQMU 302 is coupled to EUT 306 and reference data storage unit (RDSU) 312, and SQMU 304 is coupled to EUT 308 and RDSU 314. Both MQMU 302 and SQMU 304 are configured to provide quality measures of received signals. MQMU 302 provides a quality measure 316 of a signal transmitted from EUT 308 via network 310 to EUT 306, while SQMU 304 provides a quality measure 318 of signals transmitted from EUT 306 to EUT 308 via network 310. In one embodiment, timestamping of quality measures is determined so that quality measures 316 and 318 can be correlated and post-processed by a post-processing module 320 at a later time.

In one embodiment, neither LQMU 12, RRDSU 26, MQMU 302 nor SQMU 304 require a direct connection with any network. For this reason, each of these devices can operate in a manner that is independent of the network type, including its characteristics and configuration, allowing its use in conjunction with both proprietary and non-proprietary networks. As a result, the present invention may be practiced in conjunction with any of a variety of different types of networks, including switched-circuit, packet-switched, frame-relay, Internet protocol, and asynchronous transfer mode (ATM) networks. The present invention is also suitable for a variety of network transport technologies, including wireless, wired, and satellite networks. Furthermore, components of the present invention may be designed to connect to existing terminals or ports of communication equipment and to publicly or user available service access points of networks. Thus, no special set-ups or modifications of the network or of the equipment under test need be required. In various embodiments, some or all of LQMU 12, MQMU 302 and SQMU 304 are configured to be non-intrusive to permit in-service deployment.

In one embodiment, at least one of LQMU 12, MQMU 302 and SQMU 304 are implemented utilizing digital signal processing to achieve real-time quality evaluation. The quality measurements obtained are used to adaptively adjust network parameters, if network architecture or protocol information is available.

In other embodiments, voice quality assessment is improved by selecting, for example, adaptively or automatically, an appropriate algorithm for quality assessment. For example, multimedia signals transmitted via CDMA and Voice Over IP are better evaluated by algorithms that are different from standard quality measurement algorithms such as International Telecommunications Union (ITU) standard P.861 Perceptual Speech Quality Measurement (PSQM) or Measuring Normalizing Blocks (MNB), another ITU-developed measuring algorithm to measure voice quality off-line using files stored in a computer. In one embodiment, at least one of LQMU 12, MQMU 302 and SQMU 304 are programmable for different system applications. In one embodiment, a variety of test signals are selected, either manually or under control of at least one of LQMU 12, MQMU 302 and SQMU 304. For example, artificial voice-like signals designed by standard-generating bodies such as ITU may be selected.

In one embodiment, storage 32, 310, and 312 include any of several different types of storage media or a relay device such as one that communicates to another device having storage media.

In one embodiment, at least one of LQMU 12, MQMU 302 and SQMU 304 are operatively coupled to at least one of a global positioning satellite (GPS) receiver (not shown) and a digital map (not shown) to automatically generate a quality of service map for example, test signals for a wireless telephone network are transmitted repeated to a moving EUT 16, 306, or 308, and performance measurements are performed and analyzed as a function of position.

It will be evident to those skilled in the art that many other modifications are possible within the spirit of the invention. Therefore, the scope of the invention should be determined by reference to the claims appended below and their equivalents.

What is claimed is:

1. A method for measuring perceptual quality of at least one of voice signals, audio signals, audio-video signals and multimedia signals in communication equipment in an operational environment comprising the steps of:

transmitting a processed test signal via a communication network from a first device, wherein the test signal is at least one of a voice signal, audio signal, audio-video signal, and multimedia signal;

receiving the processed test signal utilizing a second device operatively coupled to the first device for injecting a signal into first device for transmission as the test signal and to the network for receiving the test signal;

processing the processed test signal to recover a representation of the test signal;

injecting a representation of the test signal in to the first device utilizing the second device;

further processing the representation of the test signal utilizing the first device;

transmitting the processed representation of the test signal to the second device via the network; and analyzing perceptual quality of the recovered representation of the test signal by comparing the recovered representation of the test signal to a pre-stored representation of the test signal and comparing the recovered test signal to a pre-stored representation of the test signal.

2. A method in accordance with claim 1 wherein the first device comprises a remote data storage unit (RRDSU) operatively coupled to the network to communicate a processed test signal therethrough, and the second device comprises an item of equipment under test (EUT) operatively coupled to the network for receiving the processed test signal and to a quality measurement unit (QMU) for analyzing quality of the recovered test signal;

said method further comprising the step of analyzing signals recovered by the EUT to determine that a test signal has been recovered prior to said step of analyzing quality of the recovered test signal.

3. A method in accordance with claim 2 further comprising the step of the QMU displaying an indication of the quality of the recovered test signal.

4. A method in accordance with claim 2 further comprising the step of contacting the RRDSU from the EUT via the network prior to said step of communicating the processed test signal.

5. A method in accordance with claim 4 wherein the network comprises a telephone network, the EUT comprises a telephone, and said step of contacting the RRDSU from the EUT via the network comprises the step of dialing a phone number of the RRDSU.

6. A method in accordance with claim 5 wherein the step of contacting the RRDSU from the EUT further comprises the step of dialing a voice mailbox access code.

7. A method in accordance with claim 2 wherein said step of analyzing quality of the recovered test signal is performed while the processed test signal is being received by the EUT.

8. A method in accordance with claim 2 further comprising the step of storing the recovered test signal, and wherein said step of analyzing quality of the recovered test signal is performed after the test signal has been stored.

9. A method in accordance with claim 8 wherein said further comprising the step of disconnecting the EUT from the network prior to said step of analyzing quality of the recovered test signal.

10. A method in accordance with claim 2 wherein said step of analyzing quality of the recovered test signal is performed digitally.

11. A method in accordance with claim 2 further comprising a step of selecting a quality assessment method in accordance with a characteristic of the network.

12. A method in accordance with claim 2 wherein the network is a wireless telephone network, said steps of communicating a processed test signal and of analyzing quality of the recovered test signal are performed repeatedly, and said method further comprises the steps of:

moving the EUT so that the repeated communications of the processed test signal are received in different positions of the EUT; and analyzing quality of the recovered test signals as a function of the different positions of the EUT.

13. A method in accordance with claim 2 wherein processed test signal communicated by the first device to the second device is a processed representation of a first test signal, and further comprising the steps of:

injecting a representation of a second test signal into the EUT utilizing the QMU;

further processing the second test signal utilizing the EUT;

communicating the processed second test signal from the EUT to the first device via the network; and further processing the communicated, processed second test signal to recover a representation of the second test signal utilizing the first device; and objectively analyzing perceptual quality of the recovered second test signal by comparing the recovered second test signal to a pre-stored representation of the second test signal.

14. A method in accordance with claim 13 further comprising separately storing results of the analysis of the quality of the recovered first test signal and of the recovered second test signal, and associating time stamps with each of the separately stored results for later correlation and further processing of the separately stored results.

15. A method in accordance with claim 1 wherein the first device comprises equipment under test (EUT) and the second device comprises a quality measurement unit (QMU).

16. A quality measurement device for measuring quality of signals transmitted via a communication network to equipment under test (EUT), said quality measurement device comprising a local reference data storage unit (LRDSU) having a representation of a test signal stored therein, and further configured to control the EUT to communicate a processed representation of said test signal via the network, said quality measurement device configured to:

communicate with the EUT;

analyze signals received and recovered by the EUT to identify recovered test signals;

objectively analyze perceptual quality of said identified and recovered test signal while a processed said test signal is being received by the EUT;

receive, via the network, a representation of said test signal communicated by the EUT under control of said quality measurement device, and objectively analyze perceptual quality of said test signal communicated via the network to said quality measurement device.

17. A quality measurement device in accordance with claim 16 further configured to analyze at least one type of said test signal selected from the group consisting of voice signals, audio signals, video signals, and multimedia signals.

18. A quality measurement device in accordance with claim 17 further configured to display an indication of the quality of said identified and recovered test signal.

19. A quality measurement device in accordance with claim 17 further configured to synchronize with test signals recovered by the EUT to identify said recovered test signal.

20. A quality measurement device in accordance with claim 17 further comprising local storage, said quality measurement device further configured to store said identified and recovered test signal in said local storage and to analyze said identified and recovered test signal after storage.

21. A quality measurement device in accordance with claim 20 further configured to effect disconnection of the EUT from the network prior to said quality measurement device analyzing said identified and recovered test signal.

22. A quality measurement device in accordance with claim 17 further configured to select a quality assessment method for objectively analyzing perceptual quality of said identified and recovered test signal in accordance with a characteristic of the network.

23. A quality measurement device in accordance with claim 16 further configured to communicate with a wireless telephone as the EUT.

24. A quality measurement device in accordance with claim 16 further configured to record indications of objective perceptual quality of said recovered and identified test signal and to timestamp said recorded indications of quality.

* * * * *